J. CALCATERRA AND O. J. BERNARDONI.
MEANS TO PREVENT DEAD CENTERS IN ENGINES.
APPLICATION FILED MAR. 8, 1922.
1,430,491.
Patented Sept. 26, 1922.
2 SHEETS—SHEET 2.
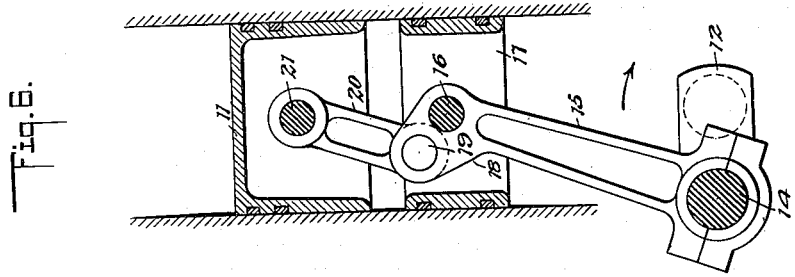
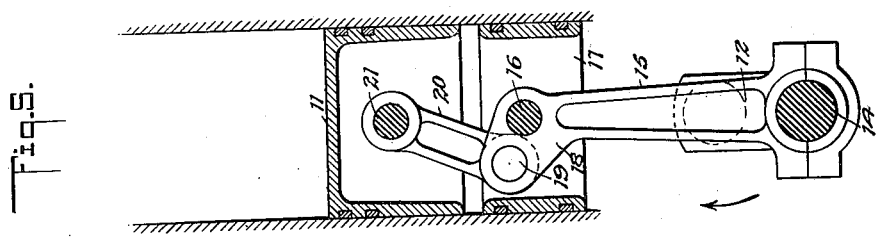
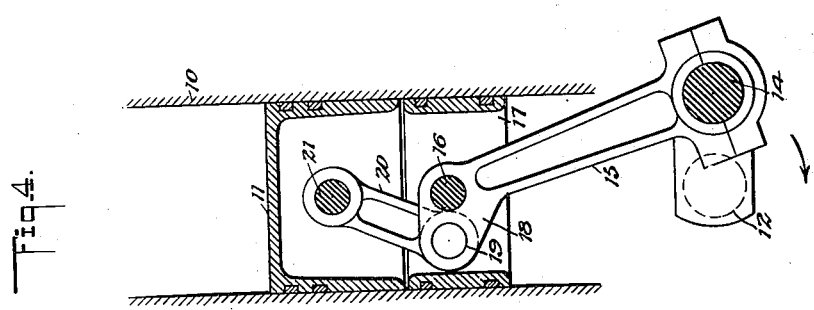
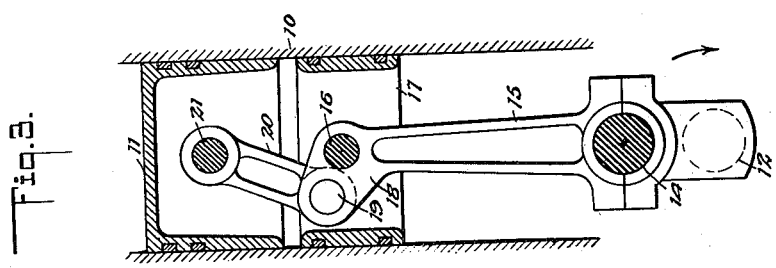
WITNESSES
INVENTOR
Joseph Calcaterra
Otto J. Bernardoni
BY
ATTORNEYS Patented Sept. 26, 1922.

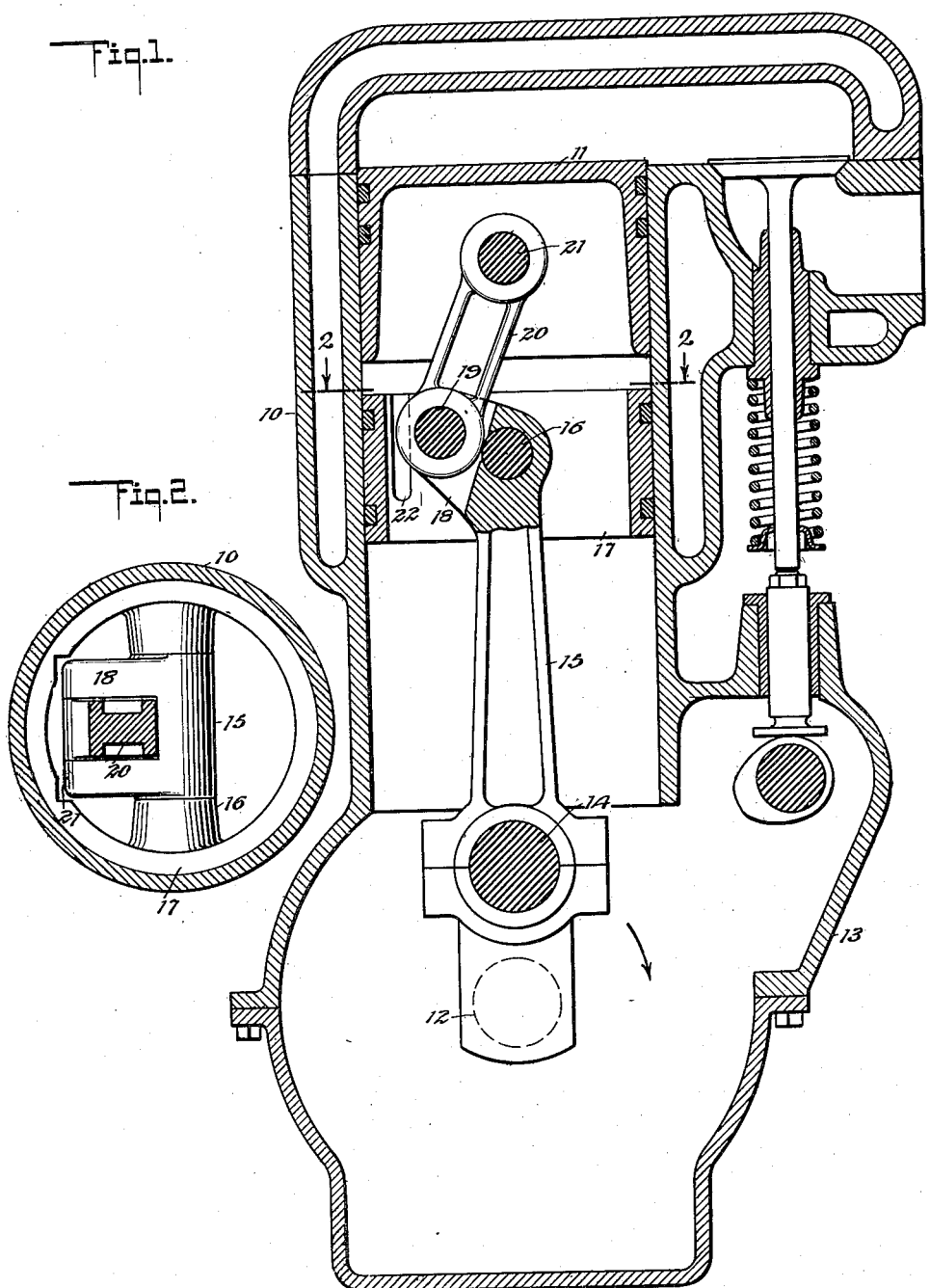

1,430,491

UNITED STATES PATENT OFFICE.

JOSEPH CALCATERRA, OF NEW YORK, AND OTTO J. BERNARDONI, OF CORONA, NEW YORK.

MEANS TO PREVENT DEAD CENTERS IN ENGINES.

Application filed March 8, 1922. Serial No. 542,128.

*To all whom it may concern:*

Be it known that we, JOSEPH CALCATERRA and OTTO J. BERNARDONI, both citizens of the United States, and residents, respectively, of the city of New York, borough of the Bronx, in the county of Bronx and State of New York, and Corona, Flushing, in the county of Queens and State of New York, have invented a new and Improved Means to Prevent Dead Centers in Engines, of which the following is a description.

Our invention relates to the piston and connecting rod of internal combustion and other engines.

The invention has for its general object to provide a connecting rod and piston assemblage so arranged as to make it impossible for the piston and the crank shaft of the engine to be dead centered. Means whereby the stated object is attained, as well as the distinctive features and advantages of the invention will clearly appear as the description proceeds.

Reference is to be had to the accompanying drawings forming a part of this specification, it being understood that the drawings are merely illustrative of one example of the invention.

Figure 1 is a vertical section showing our invention embodied in an internal combustion engine;

Figure 2 is a horizontal section on the line 2—2, Figure 1;

Figures 3 to 6 are vertical sections largely diagrammatic given to show the relative movements of the piston and connecting rod during the complete cycle of movements.

In the illustrated example of our invention showing the latter embodied in an internal combustion engine, 10 indicates the cylinder; 11, the piston; 12, the crank shaft; 13, the crank case; and 14, the crank of the shaft 12.

In accordance with our invention we provide a connecting rod 15 secured at one end in any approved manner to the crank 14. The opposite end of the piston is so formed and so arranged relatively to the piston 11 that the connecting rod will be given a rocking movement on a center at that end of the connecting rod adjacent the piston to thereby cause the opposite end of the connecting rod to swing laterally imparting a corresponding turning movement to the crank shaft to overcome the possibility of a dead center, the piston in its continued movement on the working stroke and return giving a reciprocating movement to the connecting rod through a revolution. For the stated purpose use is made of a connecting rod 15 generally of bellcrank form and pivoted at its angle as at 16 to a sleeve 17 or its equivalent adapted to reciprocate in the cylinder 10 relatively to the piston 11. The bellcrank arm 18 of the connecting rod 15 has pivotally secured thereto as at 19 a link 20 the opposite end of which is pivoted as at 21 to the piston 11.

It will be observed that the connection between the link 20 and the connecting rod 15 is at one side of the pivot 16 of the connecting rod, the result of which is that upon the power stroke of the piston the force will be exerted through the link 20 on the bellcrank arm 18, thereby rocking the connecting rod 15 and its pivot 16 and thereby the opposite end of the connecting rod 15 will be swung laterally to give a turning movement to the crank shaft 12. Thus, notwithstanding that in the starting of the power stroke of the piston 11, the pivots 14, 16 and 21 will be in alinement which ordinarily would result in dead centering, the movement of the piston will not be opposed by dead centering because of the initial movement of the piston giving a rocking movement to the connecting rod after which the piston will directly reciprocate the connecting rod and turn the crank shaft 12.

In Figures 3 to 6 different movements of the piston are shown as well as the relative movements of the said piston and the sleeve 17. In Figure 3 the piston is shown about to start on its power stroke and by comparing Figure 4 it will be seen that the piston 11 and sleeve 17 have approached each other during a quarter turn of the crank shaft by reason of the approach of the pivotal centers 16 and 21. Upon the half turn of the crank shaft as shown in Figure 5 the piston 11 and sleeve 17 will have separated by reason of the increasing distance between the pivots 16 and 21, and as shown in Figure 6, the relative movement of the piston 11 and slide 17 permits of the further separation of the pivotal centers 16 and 21 in completing one revolution of the crank shaft.

The arrangement of the piston 11 and the sleeve 17 in tandem and forming part of the same cylindric surface avoids the friction that would result were the sleeve 17 within the piston 11 to move at times in a direction the opposite of the piston. Also, the tandem arrangement described enables a sleeve 17 to be employed of the largest size within the area of the cylinder and thereby enabling a bellcrank arm 18 of the maximum length to be employed for obtaining the fullest possible leverage. The slot 22 in the plane of the path of movement of the bellcrank arm 18 further affords clearance for a bellcrank arm of maximum length.

We would state in conclusion that while the illustrated example constitutes a practical embodiment of our invention, we do not limit ourselves to the exact details herein illustrated, since, manifestly, the same can be considerably varied without departure from the spirit of the invention as defined in the appended claims. Also, it will readily be understood that the invention may be employed in pumps and air compressors.

Having thus described our invention, we claim:

1. In an engine, a piston, a connecting rod of bellcrank form adapted at one end for connection with a crank shaft, a connection between the piston and the bellcrank arm of the connecting rod, a sleeve in tandem with the piston and forming part of the same cylindric surface with the piston, and a pivotal connection between the sleeve and the connecting rod at the junction of the main and bellcrank arms of said connecting rod.

2. In an engine, a piston, a connecting rod of bellcrank form adapted at one end for connection with a crank shaft, a connection between the piston and the bellcrank arm of the connecting rod, a sleeve in tandem with the piston and forming part of the same cylindric surface with the piston, and a pivotal connection between the sleeve and the connecting rod at the junction of the main and bellcrank arms of said connecting rod; said sleeve having a slot in the same plane as the path of movement of the bellcrank arm of the connecting rod to afford clearance for the end of said rod.

JOSEPH CALCATERRA.
OTTO J. BERNARDONI.